United States Patent
Bass et al.

(10) Patent No.: US 9,470,348 B1
(45) Date of Patent: Oct. 18, 2016

(54) FLANGE ADAPTER PLATE ASSEMBLY

(71) Applicants: Raymond P. Bass, Beaumont, TX (US); David W. Bass, Tomball, TX (US); Bruce P. Henneke, Brenham, TX (US)

(72) Inventors: Raymond P. Bass, Beaumont, TX (US); David W. Bass, Tomball, TX (US); Bruce P. Henneke, Brenham, TX (US)

( * ) Notice: Subject to any disclaimer, the term of this patent is extended or adjusted under 35 U.S.C. 154(b) by 0 days.

(21) Appl. No.: 14/514,321

(22) Filed: Oct. 14, 2014

(51) Int. Cl.
  *F16L 11/00* (2006.01)
  *F16L 23/02* (2006.01)

(52) U.S. Cl.
  CPC ..................................... *F16L 23/02* (2013.01)

(58) Field of Classification Search
  USPC ............ 138/109, 121, 122, 92, 94; 285/415; 222/377, 382, 464.1
  See application file for complete search history.

(56) References Cited

U.S. PATENT DOCUMENTS

| | | | |
|---|---|---|---|
| 388,915 A * | 9/1888 | Pratt ............................ | 285/222.1 |
| 1,484,140 A * | 2/1924 | Mallory ............................ | 92/42 |
| 2,330,708 A * | 9/1943 | Harlow .......................... | 222/333 |
| 2,405,998 A * | 8/1946 | Buttner et al. ................. | 62/50.2 |
| 2,535,437 A * | 12/1950 | McCann ........................ | 138/109 |
| 3,085,438 A * | 4/1963 | St John et al. ............... | 374/121 |
| 3,170,607 A * | 2/1965 | Anthon ........................ | 222/400.7 |
| 3,498,643 A * | 3/1970 | Reiss ............................. | 285/189 |
| 4,288,105 A * | 9/1981 | Press ............................... | 285/55 |
| 6,283,157 B1 * | 9/2001 | Rocheleau .................... | 138/109 |
| 6,533,288 B1 * | 3/2003 | Brandner et al. ............. | 277/630 |
| 8,820,587 B2 * | 9/2014 | Imai et al. .................... | 222/394 |
| 2011/0204626 A1 * | 8/2011 | Degutis et al. .............. | 285/415 |

* cited by examiner

*Primary Examiner* — James Hook
(74) *Attorney, Agent, or Firm* — Harrison Law Office, P.C.

(57) ABSTRACT

A flange adapter plate assembly comprising an inside flange pattern for accepting bolt locking heads in slots disposed within recesses beneath the surface thereof. The inside flange pattern may optionally include key holes for expeditiously removing the bolts while the outside flange is secured in situ. The eduction tube portion comprises tube members having tight convolutions and a plethora of pronounced barb members. A single adapter plate reduces number of prerequisite components and also increases eduction tube strength. A twist lock protocol is used to expeditiously attach the flange adapter transition plate to a corresponding mating flange.

3 Claims, 7 Drawing Sheets

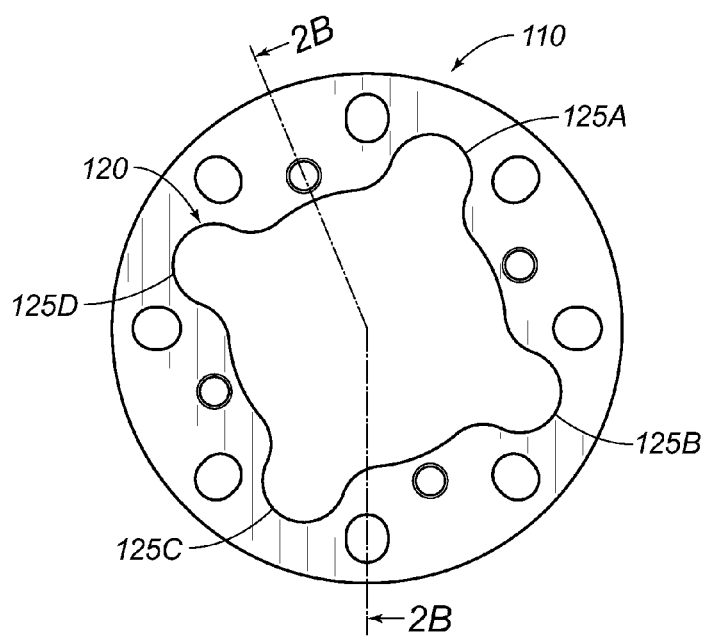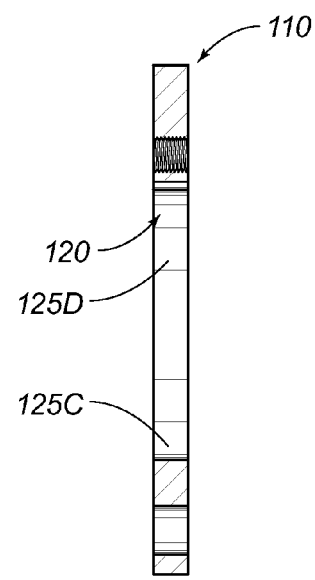
FIG. 2A
FIG. 2B
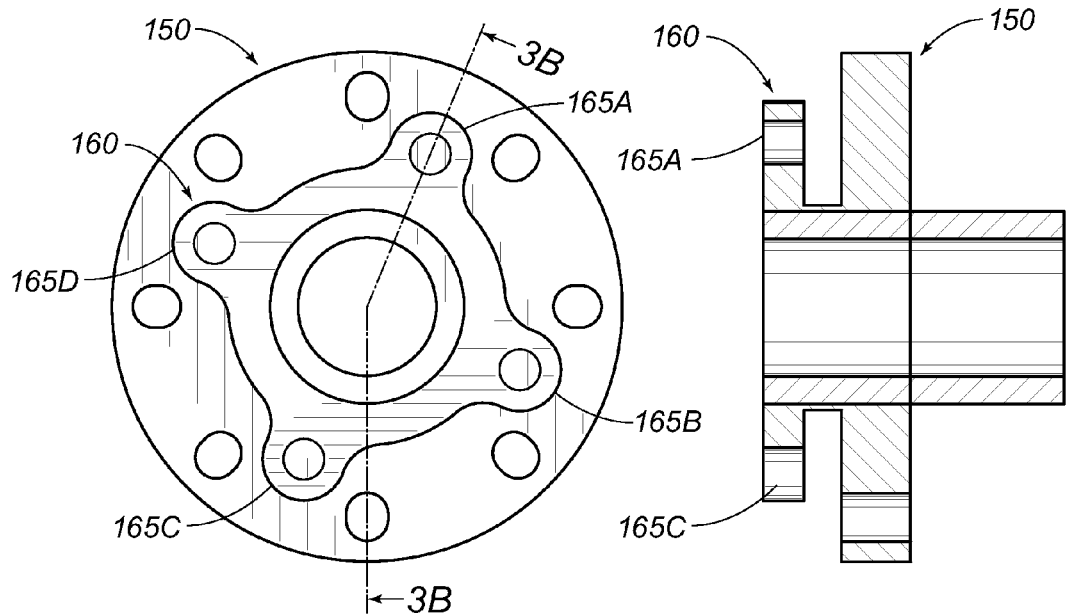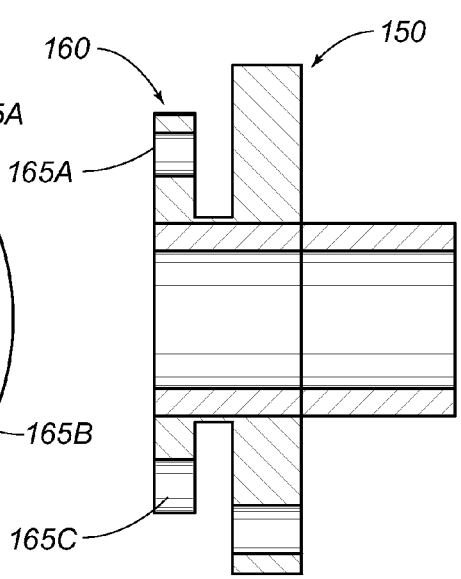
FIG. 3A
FIG. 3B

FLANGE ADAPTER PLATE ASSEMBLY

RELATED APPLICATIONS

This application claims priority based upon Provisional U.S. Application Ser. No. 61/890,357 filed Oct. 14, 2013, which is incorporated herein by reference.

FIELD OF THE INVENTION

The present invention generally relates to piping flanges, and more particularly relates to a flange adapter plate assembly for accommodating eduction tube assemblies configured with eduction tubes having improved flex attributable to tube members comprising tight convolutions and a plethora of pronounced barbs for enhancing its strength and consequent inherent resistance to collapse thereof. A single adapter plate not only reduces number of prerequisite components, but also increases eduction tube strength. A twist lock protocol is used to expeditiously attach the valve adapter transition plate to a corresponding mating flange.

BACKGROUND OF THE INVENTION

As is well known in the art, flanges and flange plates are standard fittings for coupling pipes, eduction tubes and the like to railway tank cars, truck tank trailers, and like vessels to facilitate loading and unloading of liquids such as hydrocarbons and corrosive chemicals therefrom.

While there have been improvements in the flange plate and eduction tube art, the prior art still appears to be deficient from the vantage point of reducing flanges being limited for example to each of 4"×3" flange; 4" flange×2" flange; 6" flange×3" flange. Eduction pipe flanges have heretofore been limited to low profiles such as 2.5". It will be appreciated by those conversant in the art that flanges have heretofore accepted only studs to secure connections.

Furthermore, it will also be appreciated that adapter flange plates are commonly segmented into two pieces, and adapter flange plates have been treaded directly thereinto. And, as will be readily appreciated by practitioners in the art, a common prerequisite of effective coupling of pipes to railway tank cars and the like is achieved by using two wrenches for imparting sufficient torque and tightening particularly of relatively large flange bolts.

What is needed in the art are versatile flange plate embodiments capable of being and remaining assembled during installation thereof in situ in a railway tank car or the like and also being disassembled to replace either an upper flange or a lower liner flange. Thus, such an in situ serviceability benefit has been heretofore unknown in the art.

It will also be understood that another need in the art is for a flange adapter plate that affords a lower profile than has previously been available wherein and which, of course, enables coupling of various appurtenances and pipe assemblies while complying with established railroad guidelines.

Another structural feature that would afford advantageous flange adapter plate functionality would be to include T-slot configurations for accommodating both relatively small bolt patterns and relatively large bolt patterns to enable bolt-heads of the like to be surprisingly easily secured to the extent that the conventional practice of using a wrench would be eliminated.

SUMMARY OF THE INVENTION

As will be hereinafter described, flange adapter plate assembly embodiments of the present invention are preferably configured with an inside flange pattern to accept bolts and locking bolt-heads in underneath slots, extending through either a single-flange hole pattern or through a slotted multi-flange hole pattern. It will be seen that an inside flange pattern may optionally have key holes for removing bolts, while the outside flange remains bolted. Similarly, it will be seen that the outside flange pattern may optionally hold the bolt-heads for tightening.

Flange adapter plate assembly embodiments contemplated hereunder may optionally have slots throughout disposed on the underside thereof and extending into the adapter's center hole. It will also be appreciated that entire flange adapter embodiments hereof may optionally be lined with plastic or rubber for protection of the underlying materials from corrosive chemicals and the like.

It will become apparent to those skilled in the art that embodiments of the present invention incorporate structural features that promote expeditious but secure and leak-free, well-sealed interconnection between piping and piping fittings and accessories such as valves and the like, on the one hand, and railroad tank cars, tank trucks, and other vessels. Embodiments hereof may comprise clover-leaf structure, T-slot structure or T-slot structure augmented with keyholes. Thus, the clover-leaf structure inherently affords interlocking attributes that tend to sustain assembly thereof during installation. Furthermore, such a clover-leaf structure may be readily disassembled to replace either an interconnected upper flange or a lower liner flange. Of course, these attributes will be recognized as being conducive to not only assembly and disassembly, but also to in situ serviceability.

Embodiments hereof afford low profile for such piping appurtenances as eduction pipes, wherein the reducer capability inherently reduces height manifest by connections with various piping appurtenances. It will be appreciated by those skilled in the art that this advantage virtually assures compliance with railroad guidelines and like regulations.

Moreover, assembly embodiments hereof may be constructed from a variety of dissimilar materials of construction to accommodate a like variety of chemicals being stored and transported. Such assemblies may be constructed with might be considered to constitute a "wet end" for accommodating corrosive chemicals and the like, and a "dry end' which is devoid of chemical but is relied upon to impart strength to the flange adapter plate assembly.

It will be readily understood by those skilled in the art that preferred embodiments of the present invention comprise T-slots for accommodating both small bolt-flange patterns and large bolt-flange patterns which enable flanged connections to be secured via commonly-used fastening combination of bolts, nuts, screw-heads in the absence of the necessity for using suitable wrench tools. Such elimination of a wrench for such securement purposes is heretofore unknown in the art.

It will also be appreciated that incorporating T-slots into a reducing clover-leaf flange plate assembly nuts may be emplaced beneath a small flange pattern by being slid inwardly from an outer edge or by being keyholed thereinto to render such part serviceable notwithstanding under circumstances in which the threaded holes fail during protracted use. Those skilled in the art will understood that such failure involving threaded holes is a prevalent and long-standing deficiency in the art. It has been found that T-slots may be emplaced in plastic or incorporate plastic grommets or the like, or may be emplaced with bottom portion of the assembly.

Keyhole embodiments of the present invention enable use of a headed screw without the necessity of disconnecting a reducer flange plate assembly during active service. This keyhole configuration also enables multiple flange pattern sizes to be implemented atop the assembly surface. It is an advantage over the prior art to be able to perform maintenance to a reducer flange assembly while in service or otherwise by using a headed screw-bolt combination as opposed to invoking commonly-used studs on relatively small hole patterns.

It will also be appreciated that yet another aspect of embodiments of the flange adapter plate assembly of the present invention is having a flex end on eduction pipe or on a hose attachment connected thereto. It appears to be unknown in the prior art to incorporate a shrink clamp, screw thread, and plurality of barbs for sealing and retaining the hose end onto relatively stiff and firm pipe.

These and other objects and advantages of the present invention will become apparent from the following specification in conjunction with the accompanying drawings, wherein these long-standing limitations of the prior art have been overcome.

BRIEF DESCRIPTION OF THE DRAWINGS

FIG. 2A is a frontal plan view depicting a four-prong flange adapter plate which twist locks onto a polyethylene four prong mating flange on an eduction tube.

FIG. 2B is a cross-sectioned side view of the flange adapter depicted in FIG. 2A along line 2B-2B therein.

FIG. 3A is a frontal plan view depicting a four-prong polyethylene connection on an eduction tube, and a cross-sectioned side view of the stainless steel four-prong valve adapter plate depicted therein.

FIG. 3B is a cross-sectioned side view of the polyethylene connection depicted in FIG. 3A along line 3B-3B therein.

DETAILED DESCRIPTION OF THE INVENTION

Reference is made herein to the figures in the accompanying drawings in which like numerals refer to like components. The present invention teaches flange adapter assembly embodiments that may be incorporated into eduction tube assembly embodiments especially suited for use in conjunction with loading a variety of corrosive liquid chemicals and hydrocarbons and the like into and unloading such variety of corrosive liquid chemicals from containment storage situated upon railway tank cars or tank truck trailers or the like. As will be appreciated by those skilled in the art, such a flange adapter assembly interconnected with an eduction tube assembly is configured to be flangedly interconnected with the remote end member of a typical suction apparatus known in the art, with suction being used for urging the loading or unloading of implicated liquid chemicals and hydrocarbons as contemplated herein.

Figure 1:
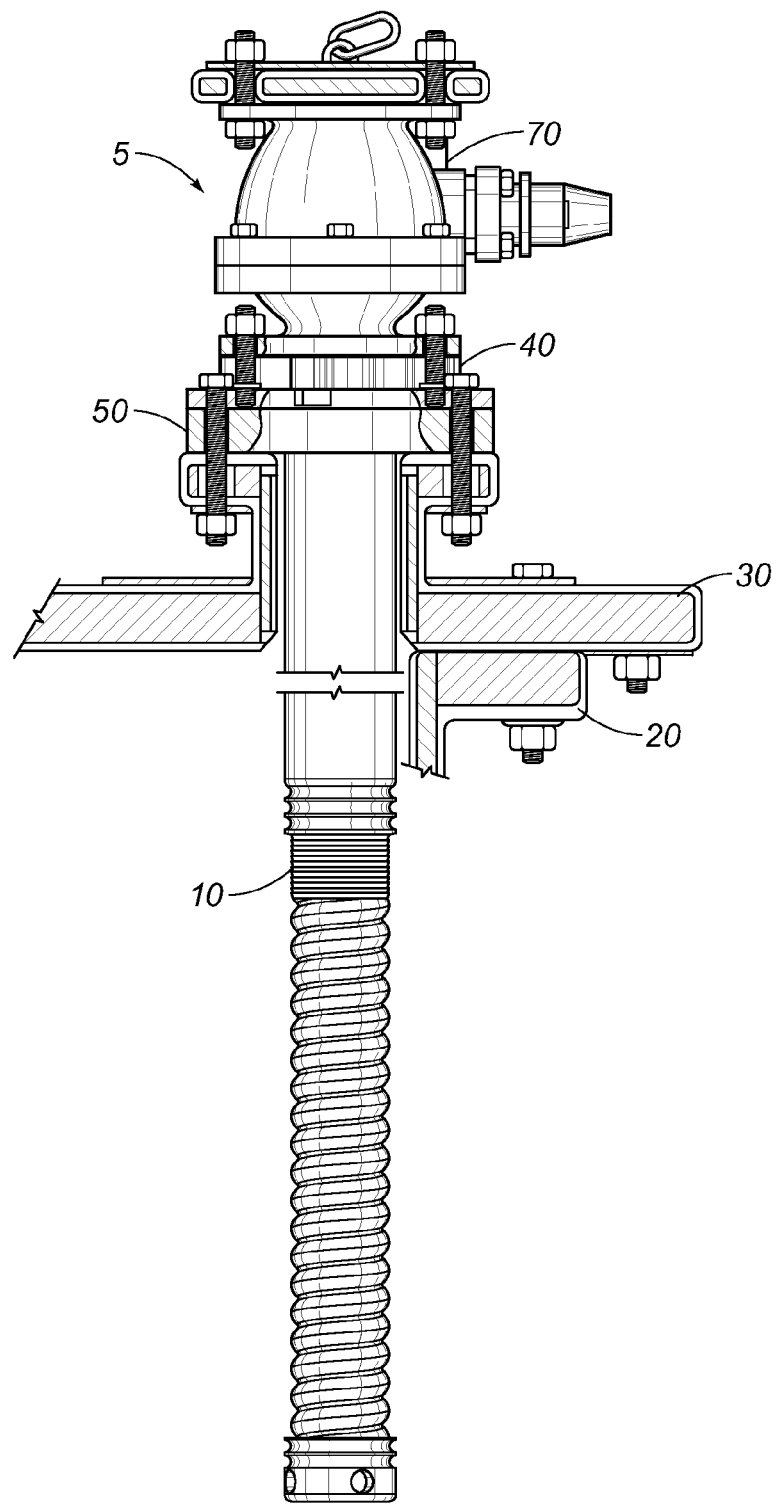
FIG. 1 is a frontal schematic view depicting a typical prior art eduction tube disposed situ in a containment vessel nozzle and a valve bolted to a flange plate.

As will hereinafter be described, as depicted collectively in FIGS. 2-8, there are depicted embodiments of the present invention which afford significant benefits and improvements relative to the prior art eduction tube assembly embodiment depicted in FIG. 1. More particularly, there is seen conventional eduction tube assembly 5 comprising eduction tube 10 passing through fittings plate 30 and interconnected with a railway tank car via eduction tube railway tank car flange 50. Also depicted therein is railcar nozzle 20 and valve 70 interconnected with eduction tube 10 via eduction tube valve flange 40.

Now referring to the embodiments of the present invention depicted in FIGS. 2-6, the adapter flange plates are preferably configured with two flanges. In the context of an eduction tube scenario, as will be hereinafter described, one flange of the adapter flange plate would be adapted to interconnect an eduction tube to a railway tank car or tank truck trailer as contemplated herein, and another flange would be adapted to preferably directly interconnect a control valve with the eduction tube—without any additional prerequisite piping. As will become clear to those skilled in the art, such direct connection as taught hereunder is enabled by incorporating into the embodiments depicted in FIGS. 2A-B, preferably stainless steel four-prong flange adapter plate 110. Flange adapter plate 110 comprises plurality of prongs 120 preferably including congruent prongs 125A-D. Unlike eduction tube assemblies known by practitioners in the art, this configuration of the instant embodiment enables four-prong flange adapter plate 110 to be expeditiously and securely twist-locked onto corresponding preferably polyethylene four-prong mating flange 150, as depicted in FIGS. 3A-B, disposed on the eduction tube hereof. Thus, plurality of prong flanges 160 preferably including each of congruent polyethylene prong flanges 165A-D is configured to mate with corresponding each of prongs 125A-D. Accordingly, it will be understood by those skilled in the art that prong 125A mates with prong flange 165A, prong 125B mates with prong flange 165B, prong 125C mates with prong flange 165C, and likewise prong 125D mates with prong flange 165D—by an operator simply effectuating a mere twist-lock motion.

Figure 4A:
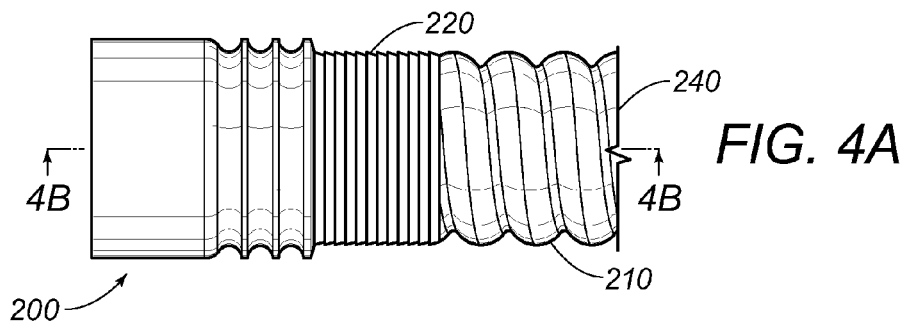
FIG. 4A is a frontal schematic view depicting a flex tube connection on the bottom end of an eduction tube fastened to the cuffed end thereof.
Figure 4B:
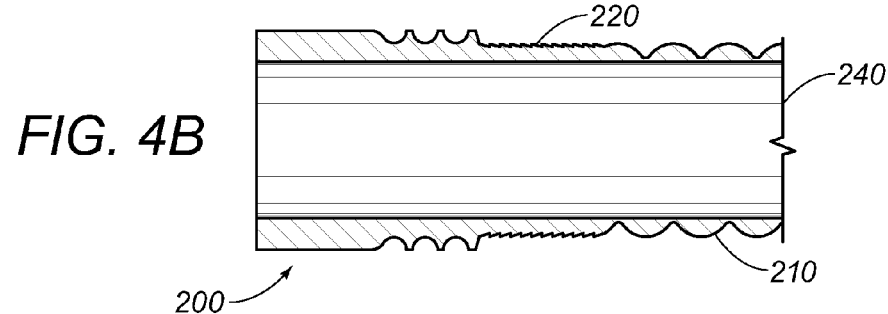
FIG. 4B is a cross-sectioned side view of the flex tube connection depicted in FIG. 4A along line 4B-4B therein.
Figure 5:
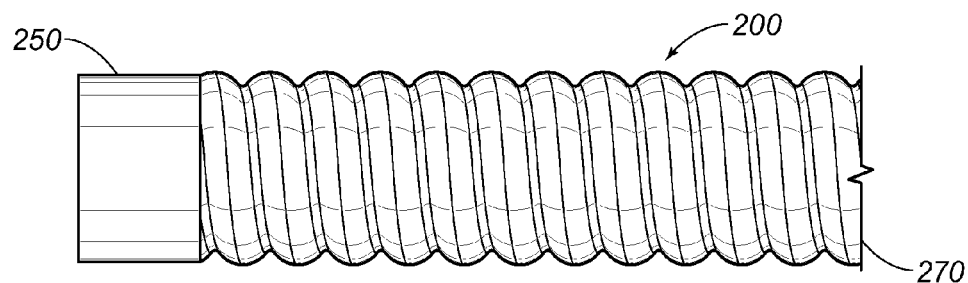
FIG. 5 is a frontal schematic view depicting the flex tube which fastens to the flex tube connection depicted in FIGS. 4A-B.
Figure 6A:
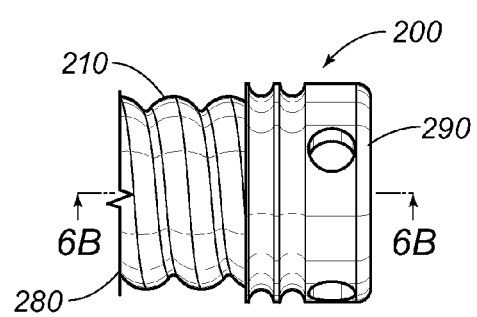
FIG. 6A is a frontal schematic view depicting the eduction tube vacuum breaker which connects to the end of the flex tube depicted in FIG. 5.
Figure 6B:
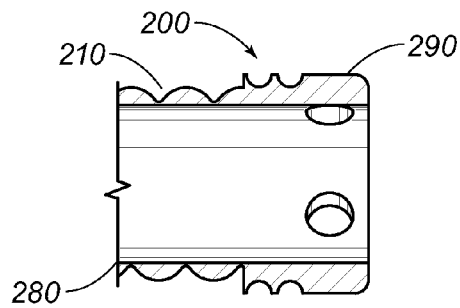
FIG. 6B is a cross-sectioned side view of the eduction tube vacuum breaker depicted in FIG. 6A along line 6B-6B therein.

FIGS. 4-6 focus upon eduction tube 200 exemplified by the instant embodiment. In particular, in FIGS. 4A-B, flex tube 210 is depicted having plurality of barb members 220 and connection 240 adapted to mate with and fasten to cuffed end 250 of flex tube 200 as shown in FIGS. 5A-B. Also shown therein is opposite end 270, adapted to accommodate interconnected vacuum breaker at 280 as, in turn, depicted in FIGS. 6A-B.

Figure 7:
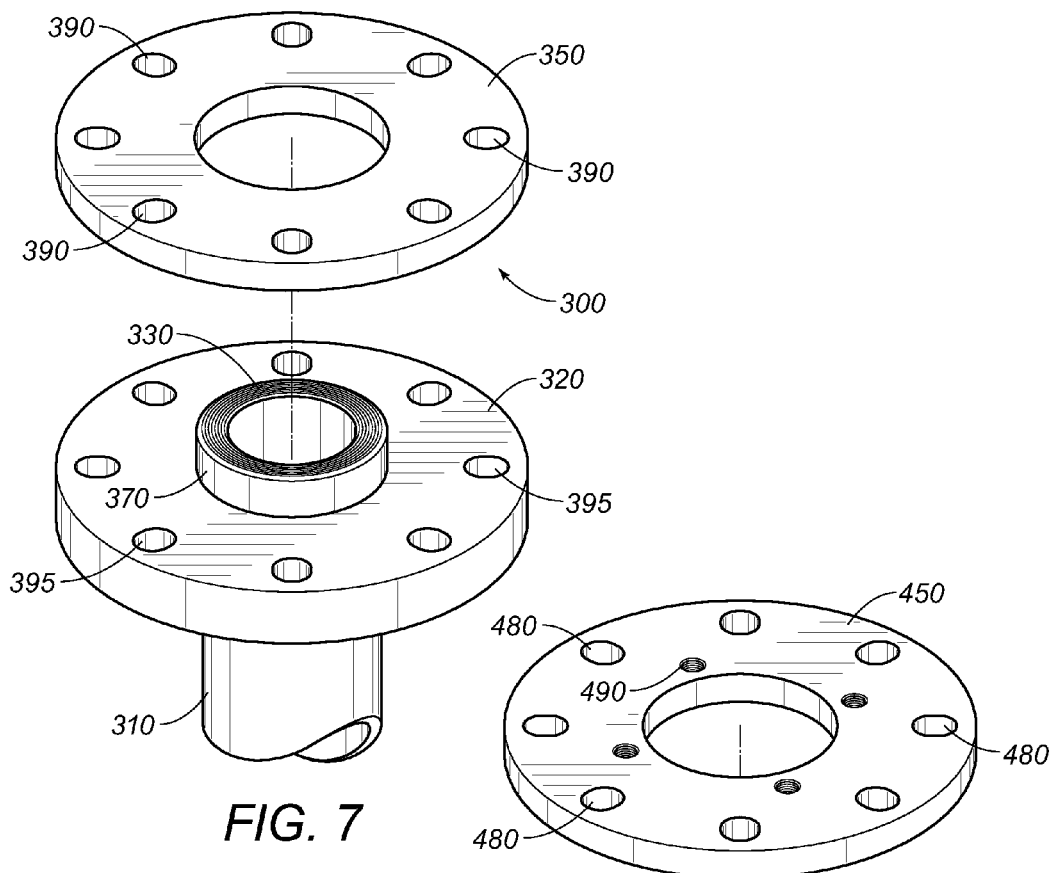
FIG. 7 is a frontal planar perspective view of a raised face eduction tube having a polyethylene spacer d, with this spacer depicted above the proximal end of the eduction tube.

Referring now to FIG. 7, there is depicted another embodiment of the present invention 300 adapted to enable the eduction tube assembly contemplated hereunder to be bolted directly to a railway tank car or tank truck trailer or like vessel. It will be appreciated that a piping spool or piping T-fitting is preferably affixed to the eduction tube flange 320 with a plurality of bolts (not shown) through like plurality of holes 390 radially distributed uniformly upon spacer top surface. A spacer sandwich member 350 preferably constructed from polyethylene should preferably be interspersed between the eduction tube 310 and the piping spool or piping T-fitting 320. Gasket surface 330 is situated atop raised face 370 of eduction tube 310. A suitable valve is then connected to the piping spool or piping-T via a plurality of bolts or the like. As should be evident to those skilled in the art, this plurality of bolts passes through corresponding plurality of holes 390 and 395, respectively, to achieve the contemplated secure flanged connection.

Figure 8:
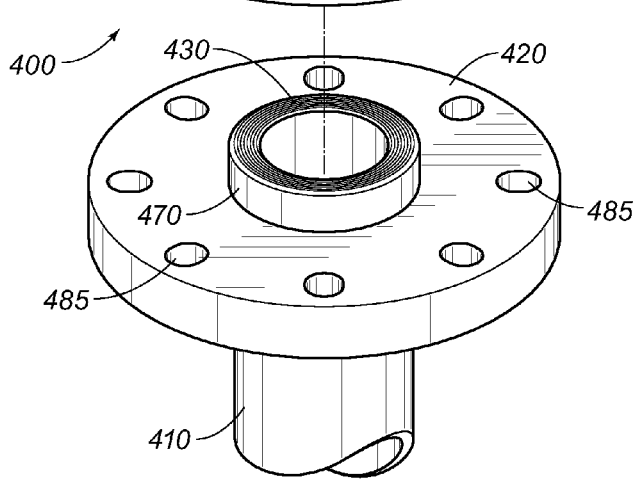
FIG. 8 is a frontal planar perspective view of a raised face eduction tube having a stainless steel valve transition plate used to fasten valve similar to the design of the eduction tube as shown in FIG. 1 but having a raised face and no four-prong locking connection.

In FIG. 8, there is depicted yet another embodiment hereof 400, but which corresponds to an implementation of the stainless steel flange adapter plate 450 contemplated hereunder instead of the polyethylene spacer member 350 depicted in FIG. 7. As shown therein, the eduction tube 410 is secured to the railway tank car or tank truck trailer or like vessel preferably via a plurality of bolts (not shown) by passing through like plurality of bolt holes 490, while the stainless steel adapter plate 450 is similarly secured to the eduction tube flange 470. The stainless steel flange adapter plate is preferably configured with a plurality of stud members 480 that enable a suitable valve to be attached to the eduction tube. As should be evident to those skilled in the art, this plurality of stud members 480 passes through corresponding plurality of holes 485, respectively, to achieve the contemplated secure flanged connection.

It will be understood that the eduction tube assembly embodiment depicted in FIG. 8 may be derived from an eduction tube assembly depicted in FIG. 7 by appropriately modifying an eduction tube utilizing additional piping in order to connect a suitable valve to a dual flanged configuration and replacing the polyethylene spacer with a stainless steel adapter. In so doing, this raised-face eduction tube assembly 400 having a stainless steel transition plate 490 would be used to connect a valve similar to the prior art eduction tube assembly 5 depicted in FIG. 1, except for the presence of the raised face 470 and there no longer being a four-prong locking connection.

Figure 9:
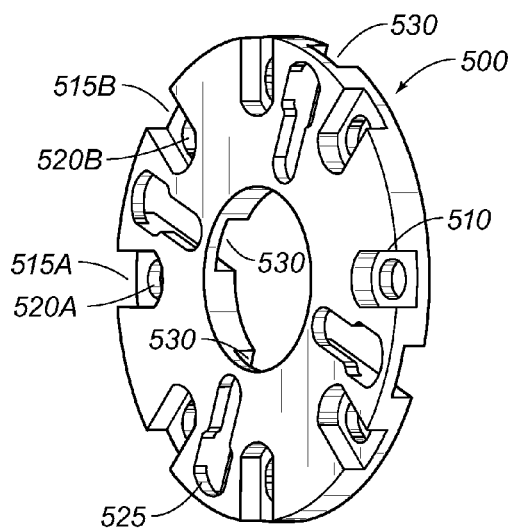
FIG. 9 is a frontal perspective view of a T-slot flange adapter plate configured with elongate keyhole slots and with bolt recess slots.

Referring now to FIG. 9, there is depicted top surface view of T-slot flange apparatus adapter plate 500 having plurality of elongate keyhole slots 525 and plurality of bolt recess slots 510 configured with circular holes for receiving corresponding plurality of suitably-sized bolts therethrough. Circular holes 515A and B are representative of plurality of bolt circular recess slots 510. Disposed within each recess slot of plurality of recess slots 510 is corresponding plurality of circular holes exemplified by circular holes 520A and B. Plurality of elongated recess slots 530 is also shown. In the event that elongated recess slots 530 do not extend fully into center bore of adapter plate 500, a plastic or rubber liner may be applied to the faces and bore.

Figure 10:
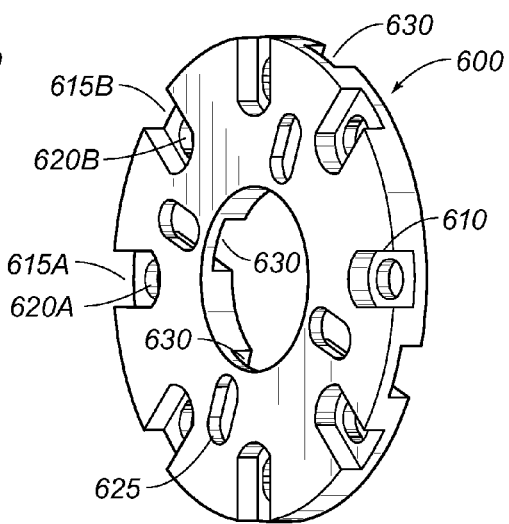
FIG. 10 is a frontal perspective view of another T-slot flange adapter plate configured without elongate keyhole slots and with bolt recess slots.

Now referring to FIG. 10, there is depicted top surface view of T-slot flange apparatus adapter plate 600 being devoid of elongate keyhole slots and plurality of bolt recess slots 610 configured with circular holes for receiving corresponding plurality of suitably-sized bolts therethrough. Circular holes 620A and B, disposed within corresponding recess slots 615A and B, representative of plurality of bolt circular recess slots 610. Elongated recess slot 630 is also shown. In the event that elongated recess slots 630 do not extend fully into center bore of adapter plate 600, a plastic or rubber liner may be applied to the faces and bore.

Figure 11:
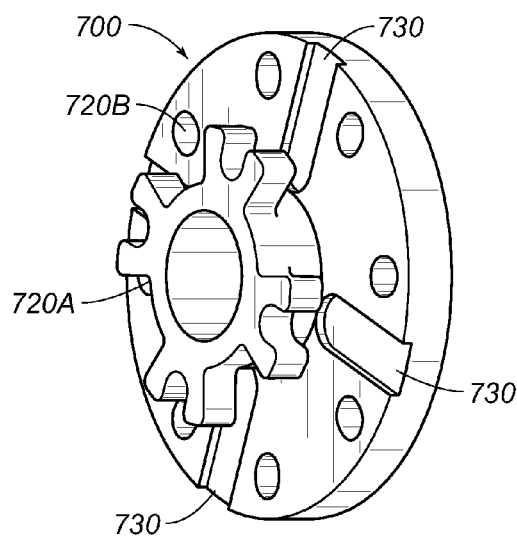
FIG. 11 is a frontal perspective view of a clover-leaf flange adapter plate configured with elongate keyhole slots and with bolt recess slots.

FIG. 11 depicts top surface view of clove-leaf flange apparatus adapter plate 700 being devoid of elongate keyhole slots and plurality of bolt recess slots 730 configured with circular holes for receiving corresponding plurality of suitably-sized bolts therethrough. Circular holes 720A and B are representative of the plurality of bolt circular holes. It should be understood that flange adapter plate 700 is configured to accept an adapter plate interlocking at each sector. It will be seen that FIG. 11 refers to four such sectors. Such an interlocking adapter enables replacement of the plate to be effectuated independently of clove-leaf flange 700.

Figure 12A:
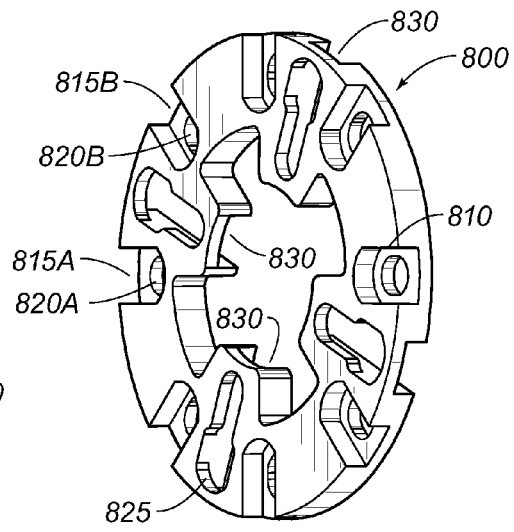
FIG. 12A is a frontal perspective view of another clover-leaf flange adapter plate configured without elongate keyhole slots and with bolt recess slots.
Figure 12B:
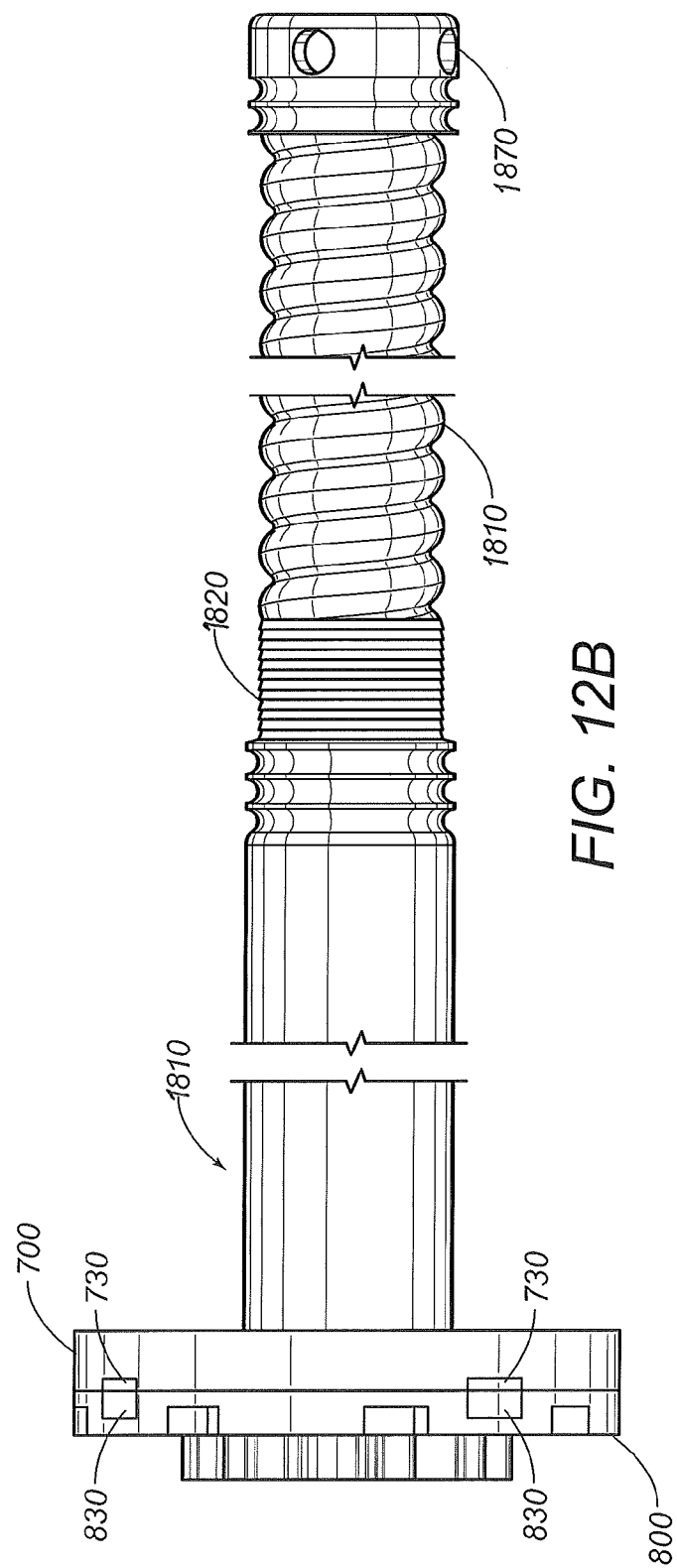
FIG. 12B is a side schematic view of a eduction tube assembly connected to the flange adapter plate depicted in FIG. 12A.

Now referring to FIG. 12A, there is depicted top surface view of another clove-leaf flange apparatus adapter plate 800 having elongate keyhole slots and plurality of bolt recess slots 810 configured with circular holes for receiving corresponding plurality of suitably-sized bolts therethrough. Circular holes 820A and B are representative of plurality of bolt circular holes contained within like plurality of elongated recess slots 815A and B. Elongated recess slot 830 is also shown. FIG. 12B depicts the underlying structure and connected piping and appurtenances thereto, beneath flange adapter plate 800 depicted in FIG. 12A. Thus, depicted are flanged joinder of 830 and 730, and flanged connection with eduction tube assembly 1810 comprising tube 1820, plurality of barbs 1840 and collar 1870.

Figure 13:
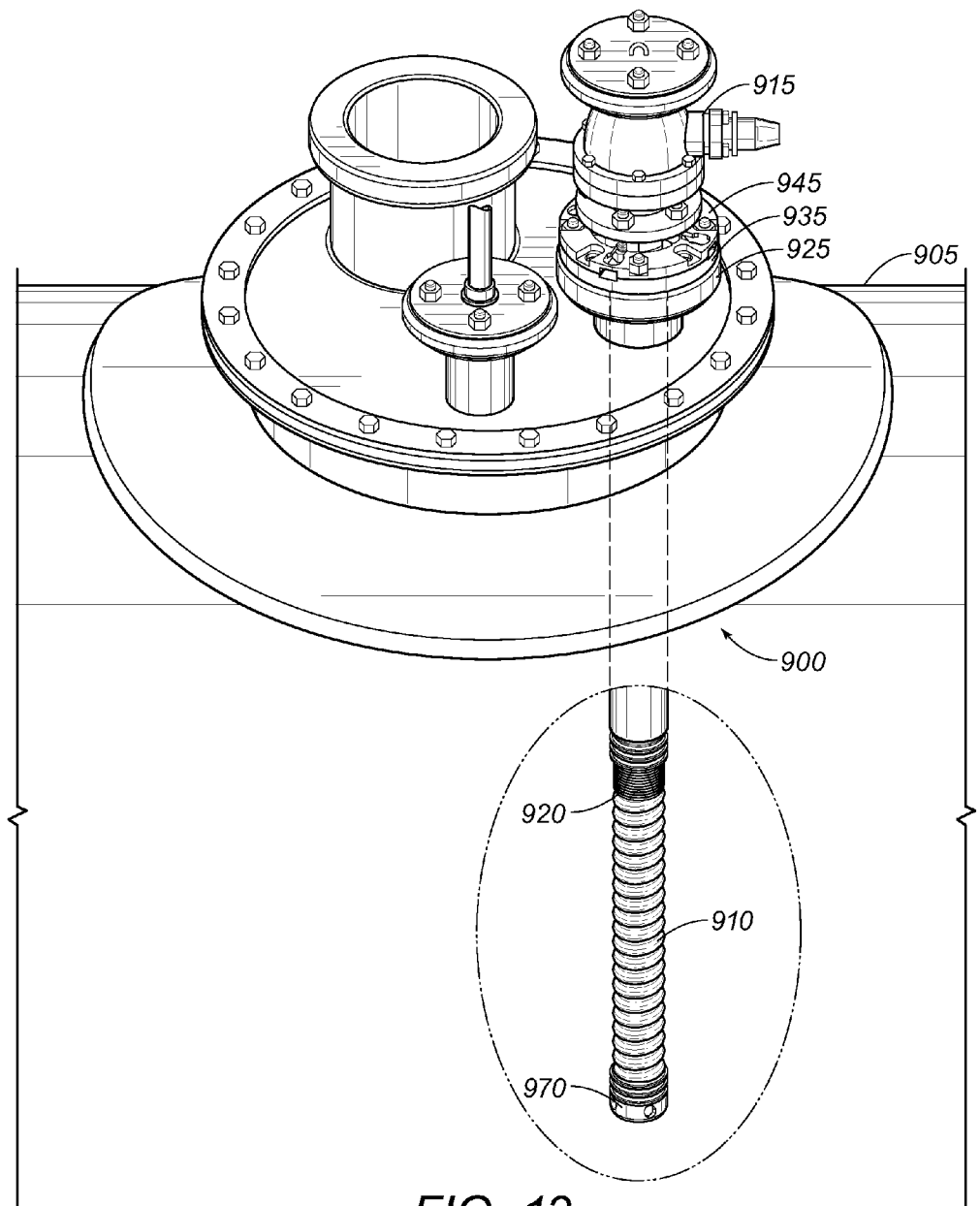
FIG. 13 is a simplified partial schematic perspective view of a flange adapter plate interconnected with an eduction tube and a railroad tank car manway.

FIG. 13 depicts top perspective view of in situ flange apparatus adapter plate 900 having plurality of elongate keyhole slots 945 and plurality of bolt recess slots individually adjacent thereto configured with corresponding plurality of circular holes for receiving corresponding plurality of suitably-sized bolts therethrough. Flange apparatus adapter plate 925 is disposed atop eduction pipe flange which is, in turn, disposed atop rail car nozzle flange 935. The eduction tube is configured with tube 920, plurality of barbs 910 and end collar 970.

It should be understood that embodiments of the present invention enjoy the benefit of having deep, annular gasket rings that afford superior sealing capabilities.

The following is a tabulation of the components depicted in the drawings:

| Component Listing | | |
| --- | --- | --- |
| Numeral | Component | Remarks |
| 5 | Prior art eduction tube assembly | |
| 10 | Eduction tube | |
| 20 | Railcar nozzle | |
| 30 | Fittings plate | |

-continued

| Component Listing | | |
|---|---|---|
| Numeral | Component | Remarks |
| 40 | Eduction tube valve flange | |
| 50 | Eduction tube railcar flange | |
| 70 | Valve | |
| 100 | Eduction tube assembly, dual flange | |
| 110 | 4-prong valve adapter plate | Stainless steel |
| 120 | 4 prongs | |
| 125A-D | Each of 4 prongs | |
| 150 | 4-prong dual valve flange | |
| 160 | 4 mating flanges | Mated to prongs |
| 165A-D | Each of 4 mating flanges | |
| 200 | Eduction tube | |
| 210 | Flex tube member | |
| 220 | Plurality of barb members | |
| 240 | Mating connection for flex tube cuffed end | |
| 250 | Flex tube cuffed end | |
| 270 | Flex tube vacuum breaker end | |
| 280 | Flex tube attachment | |
| 300 | Eduction tube assembly raised face with spacer | |
| 320 | Eduction tube | |
| 330 | Gasket surface | |
| 350 | Spacer | |
| 370 | Raised eduction tube face above spacer | |
| 390 | Plurality of holes to fasten spacer to eduction tube | Plurality of bolts & nuts |
| 400 | Eduction tube assembly with stainless steel adapter plate | |
| 410 | Eduction tube | |
| 420 | Eduction tube flange | |
| 430 | Gasket surface | |
| 450 | Transition flange with threaded stud holes | Stainless steel |
| 470 | Raised face above transition flange | |
| 480 | Plurality of stud members | |
| 485 | Plurality of stud members | Corresponding to 480 |
| 490 | Plurality of bolt holes | |
| 495 | Plurality of bolt holes | Corresponding to 490 |
| 500 | Flange adapter plate, with keyhole slots | Top surface |
| 510 | Plurality of bolt recess slots, circular holes | |
| 515A-B | Bolt Recess pair, circular holes | |
| 520A-B | Circular hole pair | |
| 525 | Plurality of elongated recess slots | |
| 530 | Elongated recess slot | |
| 605 | Flange adapter plate, without keyhole slots | Top surface |
| 610 | Plurality of bolt recess slots, circular holes | |
| 615A-B | Bolt Recess pair, circular holes | |
| 620A-B | Circular holes | |
| 625 | Plurality of elongated recess slots | |
| 630 | Elongated recess slot | |
| 700 | Clove-leaf flange adapter plate, without keyhole slots | |
| 720A-B | Bolt circular holes | |
| 730 | Bolt recess slots | |
| 800 | Clove-leaf flange adapter plate, with keyhole slots | |
| 810 | Plurality of bolt recess slots | |
| 820A-B | Bolt circular holes | |
| 815A-B | Bolt elongated slots | |
| 825 | Plurality of keyhole recess slots | |
| 830 | Elongated recess slot | |
| 1810 | Eduction tube assembly | |
| 1820 | Eduction tube | |
| 1840 | Plurality of barbs | |
| 1870 | collar | |

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the present invention is to be measured by the scope of the appended claims.

What is claimed is:

1. A flange adapter plate assembly comprising:
   a circular plate member having a central bore hole, a first surface and a second surface, with said second surface disposed diametrically opposite of said first surface;
   said first surface comprising a first plurality of circular bolt holes partially enclosed within a corresponding second plurality of recesses, both said first plurality of circular bolt holes and said second plurality of recesses disposed radially of said central bore hole and distributed uniformly relative to the circumference of said circular plate member;
   said second surface comprising a third plurality of elongated slots disposed radially of said central bore hole and distributed uniformly relative to the circumference of said circular plate member;
   said third plurality of elongated slots uniformly interspersed between said first plurality of circular bolt holes partially enclosed within said corresponding second plurality of recesses;
   each circular bolt hole of said first plurality of circular bolt holes extending from said first surface through said second surface;
   each elongate slot of said third plurality of elongated slots extending from said second surface through said first surface;
   a first plurality of bolts for securing a flange connected to a first piping appurtenance to said first surface of said circular plate member through said first plurality of circular bolt holes;
   a second plurality of bolts for securing a flange connected to a second piping appurtenance to said second surface of said circular plate member through said third plurality of elongated slots; and
   said first surface interlocking with adjacent said second surface when said first surface is urged to rotate relative to said second surface, by hand-operation to effect secure engagement thereof by twist-locking between said first plurality of bolts with said third plurality of elongated slots.

2. A flange adapter plate comprising:
   a circular plate member having a central bore hole and an eduction tube assembly in fluid communication with said central bore hole through a fixedly attached flexible tubular member;
   said eduction tube assembly connected to said flange adapter plate and interconnected with a railway tankcar or tank truck trailer for loading and unloading corrosive chemicals and hydrocarbons;
   said flexible tubular member having a plurality of barb members configured thereupon, and having a first cuffed end and an opposite vacuum breaker end;
   a first flange control valve adapter plate for connecting said flexible tubular member to said railway tankcar or tank truck trailer and having a first plurality of prongs disposed thereon radially of said central bore hole and distributed uniformly relative to the circumference thereof; and
   a second flange adapter plate interconnected with said eduction tube assembly and having a first plurality of prong flanges configured to mate with said first plurality of prongs when urged to rotate relative to said circular plate member, by hand-operation to effect secure engagement thereof by twist-locking therebetween, for enabling a control valve to be connected with said flexible tubular member.

3. A flange adapter plate comprising:

a circular plate member having a central bore hole and an eduction tube assembly in fluid communication with said central bore hole through a fixedly attached flexible tubular member;

said eduction tube assembly connected to said flange adapter plate and interconnected with a railway tankcar or tank truck trailer for loading and unloading corrosive chemicals and hydrocarbons;

said flexible tubular member having a plurality of barb members configured thereupon, and having a first cuffed end and an opposite vacuum breaker end;

said flexible tubular member adapted to be fastened directly to said railway tankcar or tank truck trailer;

an eduction tube flange having a first plurality of prongs disposed radially of said central bore hole and distributed uniformly relative to the circumference thereof, and having a spacer sandwiched between said eduction tube and a piping spool or a piping T; and a control valve connected to said piping spool or said piping T by a flange plate having a first plurality of prong flanges configured to mate with said first plurality of prongs when urged to rotate relative to said circular plate member, by hand-operation to effect secure engagement thereof by twist-locking therebetween.

* * * * *